Sept. 9, 1941.  A. J. DREMEL  2,255,541

TOOL ADAPTER

Filed Oct. 30, 1937　　2 Sheets-Sheet 1

INVENTOR

ALBERT J. DREMEL

BY

ATTORNEYS

Sept. 9, 1941.                A. J. DREMEL                2,255,541
                              TOOL ADAPTER
                          Filed Oct. 30, 1937           2 Sheets-Sheet 2

INVENTOR
ALBERT J. DREMEL
BY
ATTORNEYS

Patented Sept. 9, 1941

2,255,541

UNITED STATES PATENT OFFICE 2,255,541

TOOL ADAPTER

Albert J. Dremel, Racine, Wis.

Application October 30, 1937, Serial No. 172,047

2 Claims. (Cl. 90—12)

This invention pertains to a tool adapter, and more particularly to attachments for converting portable, electric hand-tools to machine tool purposes, such as shaping, surface and internal grinding, routing, and so forth.

The invention has primarily for its object the provision of exceedingly simple, inexpensive, and quickly detachable adapters for converting portable electric hand-tools to special purposes requiring a fixed tool, or work support and tool guide.

Incidental to the foregoing a more specific object of the present invention resides in the provision of a support or work guide for quick attachment to the casing of a portable electric hand-tool, and means for adjusting the support with relation to the tool.

A further object is to provide a stand having a universally adjustable and quickly detachable clamp for receiving the casing of an electric hand-tool to rigidly hold the tool in any desired angle or position.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 3:
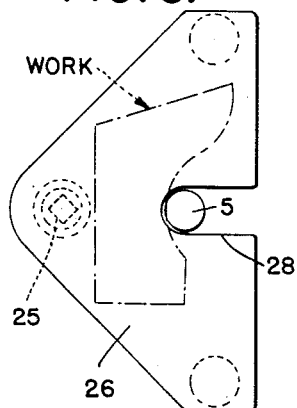
Figure 3 is a plan view of the supporting table or work guide.

Referring now more particularly to the accompanying drawings, the numeral 1 designates generally a portable hand electric tool, consisting of a cylindrical casing 2 provided at one end with a cylindrical hub 3, in which the armature shaft of the electric motor housed within the casing is journaled. A chuck 4, secured upon the motor shaft, extends beyond the hub 3 for reception of various types of tools 5 for use in grinding, cutting, polishing, and the like. The foregoing is more or less conventional, and therefore forms no part of the present invention other than in the combination as hereinafter set forth.

Figure 1:
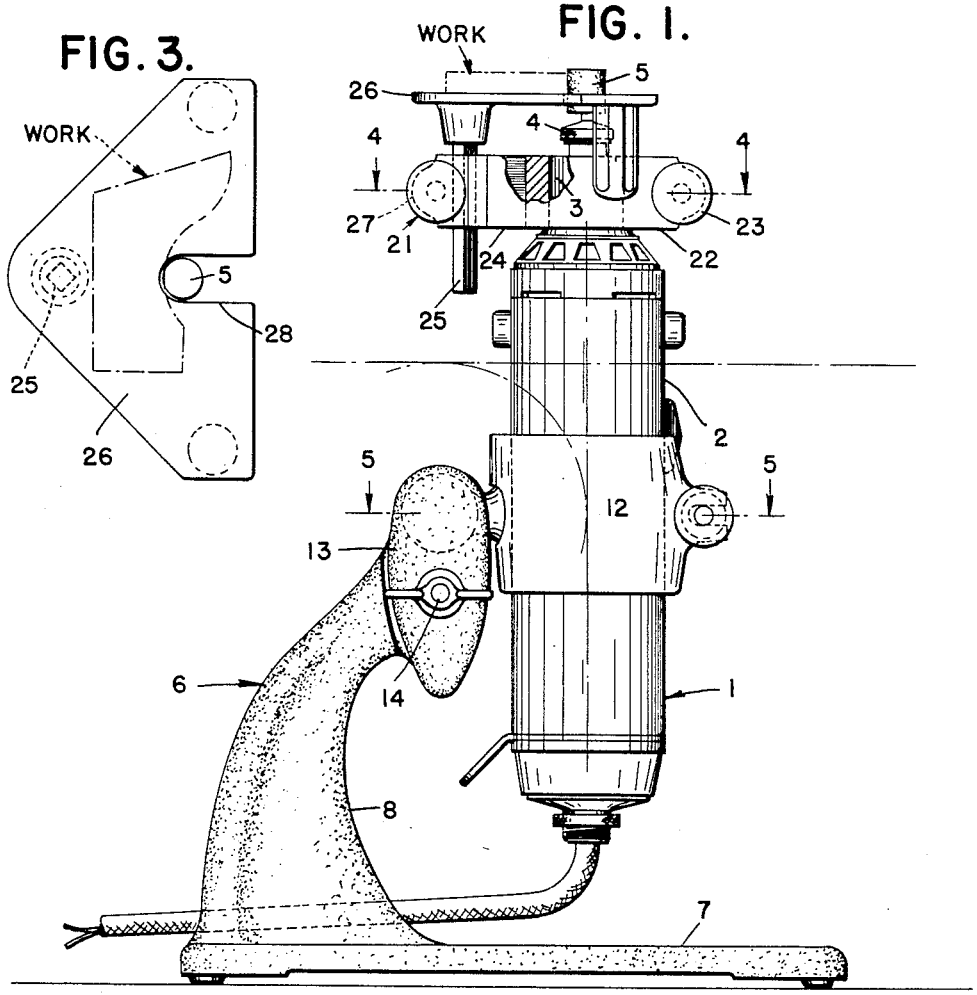
Figure 1 is an elevation of a conventional electric hand-tool, to which the present invention is applied.
Figure 4:
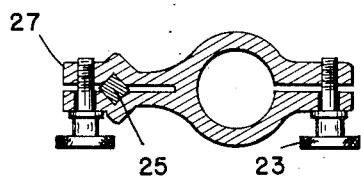
Figure 4 is a detail section taken on the line 4—4 of Figure 1.

Referring to Figure 1 of the drawings, when a fixed tool is desired instead of manual manipulation of the tool 1, a stand 6 is provided, comprising a base 7 having a vertically extending arm 8, terminating in a head 9, provided with a spherical socket 10 for reception of a ball connected with a tool clamp 12. The ball 11 is universally adjustable within the head 9, and is locked in adjustable position by means of a clamping plate 13, connected to the head 9 by a screw and thumb nut assembly 14, the plate 13 being provided with a semi-spherical socket 15 cooperating with the socket 10 to securely engage the ball 11. Obviously, the foregoing connection between the clamp 12 and the stand 6 allows the clamp 12 to be rigidly locked in any desired position convenient for the work being handled.

Figure 5:
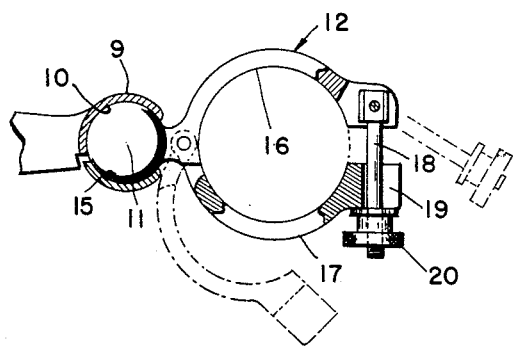
Figure 5 is a fragmentary section taken on the line 5—5 of Figure 1.

While various forms of clamps may be used for quick adjustment to the tool casing 2, one simple form has been devised comprising an arcuate arm 16 carried by the ball 11 and provided with a semi-circular strap 17 pivotally connected to the arm. For locking the arm and strap in clamping position, as best shown in Figure 5, the outer end of the arm is bifurcated for reception of a pivotal, threaded stud 18, adapted to be swung into the slotted end 19 of the strap 17. The thumb nut 20 threaded on the stud 18 serves to draw the arm and strap together to securely clamp the casing 2 of the hand tool. It will be apparent that the universal adjustment provided for the clamp 12 enables the tool to be set in any position desired, and through provision of the split hinged clamp, the tool may be quickly secured to or removed from the stand 6.

In some instances a work support is desired, and therefore I provide the attachment 21, which includes a split clamp 22 adapted to engage the bearing hub 3 of the tool casing 2, the same being locked thereon by means of a thumb screw 23. Extending from the clamp 22 is a split bracket arm 24 for reception of a square shank 25, which carries a table or work support 26. The shank is locked in adjusted position within the bracket arm 24 by a thumb screw 27 passing through the slotted end.

As best shown in Figure 3, the table 26 is preferably triangular in shape, and is provided with a notch or recess 29 adapted to straddle the tool 5, which, as shown in Figure 1, may extend any desired distance above the table through the adjustment provided for the shank 25. In that position of the tool illustrated in Figure 1, in which the table is used as a work support, the work, indicated in dot and dash lines in Figures 1 and 3, which may be of any shape, is merely placed upon the table, and is manually guided against the tool to grind, cut, or polish its edges. Obviously, internal surfaces of the work can be similarly treated, and by adjustment of the table with relation to the end of the tool, the faces of the work may also be operated upon.

Figure 2:
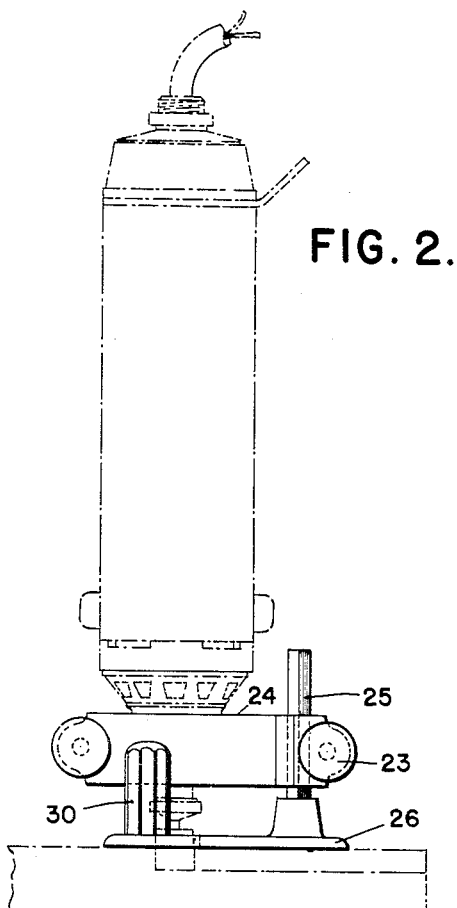
Figure 2 illustrates the manner in which one of the attachments comprising the present invention is used for routing and similar work.

When it is desired to utilize the tool and attachment 21 for routing and similar work, the tool is merely removed from the clamp 12 and inverted upon the work, as shown in Figure 2, in which the table 26 serves as a support and fixed guide for the tool. To facilitate operation of the tool when employed in the foregoing manner, the table 26 is provided with a pair of hand nibs 30, which may be conveniently gripped by the operator to move the table over the work.

Figure 7:
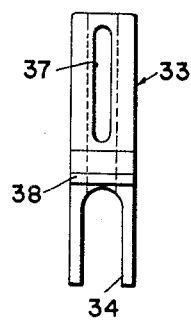
Figure 7 is a front elevation of the modified guide.
Figure 8:
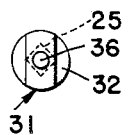
Figure 8 is an end view of the shank head upon which the modified tool guide is mounted.
Figure 6:
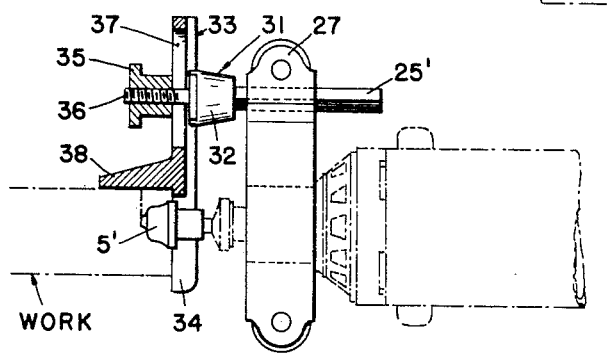
Figure 6 is a fragmentary elevation partly in section illustrating a modified form of tool guide.

Without departing from the principles of the invention, it is contemplated that various types of tool guides or work supports may be used in connection with the adapter 21, and, therefore, a modified form of guide 31 is illustrated in Figures 6 to 8, inclusive, and comprises a square shank 25' adjustably carried by the bracket 27, and provided with a head 32, the end of which is flattened for slidable reception of a grooved plate 33, the end of which is provided with a notch 34 adapted to straddle the tool 5. The plate 33 is locked in adjusted position upon the head 31 by a thumb nut 35 threaded upon a stud 36 projecting from the head 31 through a slot 37 formed in the plate 33. It will be apparent that the plate 33 will guide the tool with relation to the work in one direction, while an angular arm 38 projecting from the plate 33, and engaging another surface of the work, determines the relative position of the working tool in transverse direction. In other words, adjustment of the shank 25 in the bracket 27, together with adjustment of the plate 33 on the head 31, allows variation in the relative position of the tool and guide in two directions.

From the foregoing explanation, considered in connection with the accompanying drawings, it will be readily seen that an exceedingly simple, effective, and convenient adapter has been provided for portable electric hand tools, which enables the same to be readily converted to uses heretofore impossible in tools of the present type, in that the tool can be rigidly fixed for either surface or internal grinding, and at the same time suitable work support and guiding means is provided.

I claim:

1. The combination with a portable power-driven hand tool including a casing, an operating shaft projecting forwardly from one end of the casing, and a tool chuck on the shaft; of a clamp non-rotatably mounted on the hand tool having a socket, a shank mounted in the socket and adjustable therein longitudinally of the shaft, a combined work table and guide on the shank projecting toward the shaft and having a slot therein for the working tool, and manipulating finger pieces on the inner face of the table.

2. The combination with a portable, power-driven, hand tool including a casing, an operating shaft projecting forwardly from one end of the casing, and a tool chuck on the shaft; of a clamp non-rotatably mounted on one end of the hand tool having a socket, a shank mounted in the socket and adjustable therein longitudinally of the shaft, a combined work table and guide on the shank projecting toward the shaft and having a slot therein for the working tool, a base, and a clamp universally mounted on the base for rigidly receiving the casing and holding the casing with the work table and guide in a set work-receiving position.

ALBERT J. DREMEL.